Dec. 1, 1970   J. C. KARCHER   3,544,296
METHOD OF FORMING A SOLID PLANT NUTRIENT FROM LEONARDITE
HUMATE BEARING ORE
Filed Oct. 20, 1967
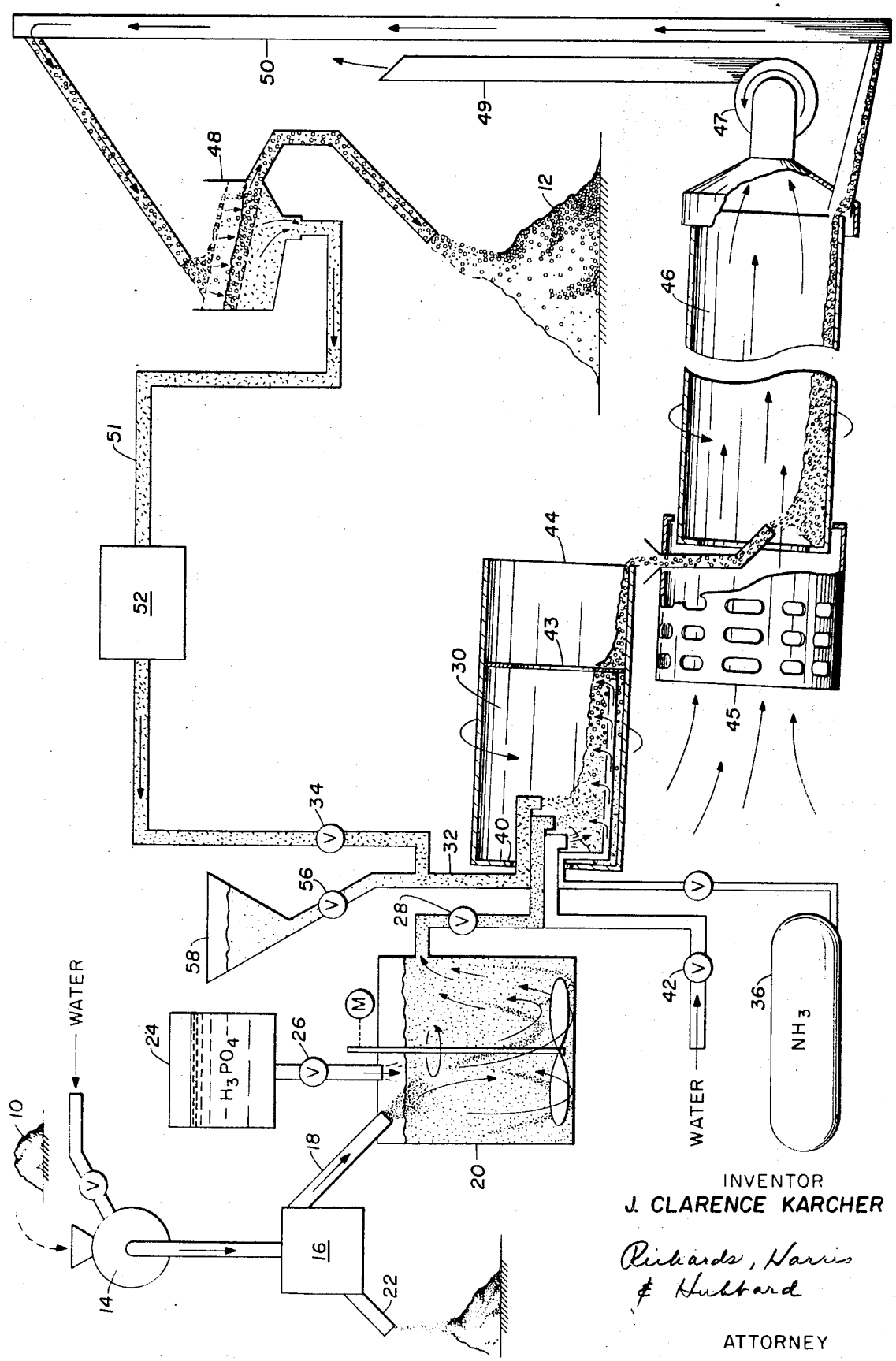
INVENTOR
J. CLARENCE KARCHER
Richards, Harris
& Hubbard
ATTORNEY

United States Patent Office 3,544,296
Patented Dec. 1, 1970

3,544,296
METHOD OF FORMING A SOLID PLANT NUTRIENT FROM LEONARDITE HUMATE BEARING ORE
John C. Karcher, Dallas, Tex., assignor to Concho Petroleum Company, Dallas, Tex., a corporation of Delaware
Filed Oct. 20, 1967, Ser. No. 676,930
Int. Cl. C05f 11/02; C05c 7/02
U.S. Cl. 71—24                            4 Claims

ABSTRACT OF THE DISCLOSURE

The method of forming a solid nutrient from leonardite ore wherein the ore is wet ground into a slurry that is treated with phosphoric acid to convert the humates therein to humic acids. The slurry is then tumbled in the presence of ammonia to form ammonium humates in such manner as particularly to utilize in a one stage operation the ammonium humates as the binder material in the formation of granules. Such granules are then dried and screened to size and have a pH between 7–9. A portion of the dried granules are recycled to provide an absorbent for the slurry feed.

BACKGROUND OF THE INVENTION

This invention relates to the production of a soil nutrient from lignite-leonardite ore and, more particularly, to a method of producing a pelletized form of soil nutrient without the need of complex equipment for reducing the moisture content of the leonardite ore before or after scrubbing and ammoniation.

Leonardite is a soft brown coal-like deposit usually found in conjunction with deposits of lignite. Leonardite contains a higher oxygen content than lignite and is believed to be an oxidized form of lignite. Chemical studies of the composition of leonardite have revealed that it is mainly composed of the mixed salts of acid radicals found in humus, a product of the decay of organic matter which contains both humic and nonhumic material. Such acid radicals are collectively termed "humic acids," individual fractions of which are humic acid, ulmic acid and fulvic acid. Oxidized forms of humic acids such as phenyl acetic acid and indol acetic acid have been found with the humic acids in the leonardite.

The humic acids have a large cation exchange capacity and hold multivalent elements very strongly. When the cation exchange sites on the humic molecule are filled predominately with hydrogen ions, the material, considered to be an acid, is insoluble in water. When the predominant cations on the exchange sites are other than hydrogen, the material is called "humate." Humates of monovalent alkali metals or ammonia are soluble in water, but the humates of multivalent metals are insoluble. The apparent size of humate complexes puts them in the domain of colloids.

Humic acids in the form of their ammonium salts are soluble and when mixed with soil have been found to have a beneficial effect on plant growth; specifically, they have increased root growth and root formation, deepened the color of leaves, flowers and fruit, increased branching at high rates, and increased the volume of fruit obtained. Such properties make these plant nutrients highly desirable.

Several different methods have been employed in extraction of humic acids from leonardite ore. For example, in U.S. Pat. 3,111,404, a liquid system is disclosed for extracting humic acid and forming ammonium humates which utilizes a centrifuge and filter press along with a drying tower to agglommerate the colloidally dispersed humates. In U.S. Pat 3,264,084, ammonium humates are shown to be formed in a system whereby apparatus is used prior to scrubbing the ore with orthophosphoric acid in order to reduce overall moisture content to about 40–60% before ammoniation. Optionally, dry fertilizer constituents are added after ammoniation to further reduce moisture levels as an aid to solidifying the humate.

It has been discovered that increased economy and efficiency in production of an improved product may be achieved by the present invention by producing granulation during ammoniation, particularly when the product is recycled to promote granulation.

SUMMARY OF THE INVENTION

It is an objection of this invention to provide a soil nutrient from lignite-leonardite ores by an improved process which increases the nutrient quality of humate products but with a material reduction of the expenditure of energy, equipment and difficulties that have heretofore plagued such extractions.

More particularly, in accordance with one aspect of the invention, ammoniated salts of humic acids are produced from lignite-leonardite ores wet ground to a relatively fine size in the presence of sufficient water to form a slurry having no more than about 65% water. The slurried ore is scrubbed with phosphoric acid and then tumbled in the presence of dry product and ammonia to produce a granule of ammonium humates having a pH in the range of 7–9, a portion of the granules being recycled to provide product to mix with the acidized slurry when it is being ammoniated. In one aspect, fertilizers may be added to the ammonium humates granule to form a more comple soil nutrient. Fertilizer may also be blended into the portion of the ammonium humate granules which are recycled for contact with acidized slurry during the ammoniation process. The net result is that the humic acid is ammoniated, blended with fertilizer, if desired, and granulated all in one operation.

THE DRAWING AND PREFERRED EMBODIMENT

For a more complete understanding of the present invention and for further objects and advantages thereof, reference may now be had to the following description taken in conjunction with the accompanying drawing in which:

The drawing is a schematic representation of the reaction system of the present invention in which is illustrated one form of a method for utilization of lignite-leonardite ores such as stock piled in a pile 10 for the production of a soil nutrient delivered to an output station 12. The system includes a wet grinder 14 where the ore is ground to particles of size preferably in the range of from 80 to 200 mesh size in the presence of sufficient water to form a slurry having a water content of not greater than about 65%. A preferred mixture is comprised of about 45% solids and 55% water.

The slurry is delivered from the wet grinder 14 to a sedimentation cell 16. In leonardite ore deposits in which the lignite has been substantially completely converted to leonardite, concentrations of undesirable inert substances such as sand and clay particles may amount to an order to about 25%. These inorganic constituents are such that they may be separated from the leonardite by floatation units or by sedimentation devices, such as jigs or thickeners, all of which are familiar methods involving well-known devices. Thus, the slurried ore introduced to unit 16 is manipulated so that the leonardite is separated from the undesirable inert substances and delivered by way of channel 18 to a scrubber 20. The heavier constituents of the ore are delivered to a waste pile by way of conveyor 22.

The scrubber 20 receiving materials from the unit 16 includes an agitator for thorough blending of the leonardite with phosphoric acid delivered from a supply 24 by way of a metering pump 26.

The reaction in the scrubber 20 is carried out with the material maintained with sufficient moisture to obtain complete chemical reaction, and for thorough mixing and convenient handling. The moisture content of the material in the scrubber preferably is maintained as stated above, that is, no more than 65% and desirably, at about 55%. The action of the phosphoric acid on the leonardite ore is to convert the ore substantially completely to humic acids including as principal constituents humic acid, ulmic acid, and fulvic acid. Residence time is that which is necessary to produce such action, and is temperature dependent. For normal operating temperatures of from 70° F. to 100° F., residence time will be about one to two hours.

The ore-acid slurry is delivered through a metering pump 28 to a slightly sloping rotating drum 30 to which previously processed and recycled product has been or is concurrently introduced from channel 32 through valve 34. The rotation of the drum tumbles the slurry from unit 20 with the dried product from channel 32 to lower the total proportion of liquid to solids. Anhydrous ammonia is added to the tumbling mixture of slurry and product from a receptacle 36 in sufficient quantity to react with the "humic acids" in the slurry emerging from scrubber tank 20 to form "ammonium humates." It has been found that satisfactory amounts of ammonia are in the range of about 1 part ammonia to 10 parts total acid present, including humic acids and any unexpended phosphoric acid. The overall pH of the ammoniated slurry may range from between pH 6 and 10, but preferably pH is maintained between 7.5–9. The presence of recycled product not only materially lowers the ratio of water to solids, but substantially prevents gel formation of colloidally dispersed humates from forming in the drum, thereby eliminating fouling problems.

Water may be introduced into the closed end 40 of rotating drum 30 through metering pump 42 in order to maintain the total moisture level of the slurry-recycled product mixture between about 25–40%. With such a moisture level, as the mixture tumbles down the rotating downwardly sloping drum 30, it will progress toward the annular dam 43 with increasing homogeneity until it begins to particulate or bead. By the time it has reached open end 44 it will have formed crumbs or granules having a moisture content within the indicated range but preferably on the order of about 35%.

In a particular embodiment, the rotating drum 30 may be dimensionally on the order of about twice as long as it is wide, for example, 20 feet long and 10 feet in diameter. For such dimensions the average residence time of the tumbling mixture is about 8 to 10 minutes.

The granules from the rotating drum 30 are then conveyed to a drier 46 to adjust their residual moisture content to a level of from about 5% to 10%. The drier 46 may be of rotary kiln or other conventional type. Such a kiln may be slightly sloped and on the order of 7 to 8 times longer than it is wide, for example, 10 feet in diameter and 70 feet long. Average residence time of the granules for such a kiln is about 15 minutes.

Heated air is drawn through the dryer 46 concurrently with the flow of the wet granules entering the dryer from the rotating drum 30. The air is heated as it is drawn through the gas, oil or coal fired furnace 45 into and through the dryer 30 by the suction fan 47 and blown out a stack. The burner in the furnace is adjusted manually or automatically to maintain a temperature of the air stream at the output end of the dryer 30, at about 170° to 200° F., and preferably 175° F. to produce the stated moisture content. The ammonia content of the product, and thus the pH of the product, varies with water content. Undue heating which reduces the moisture content below 5% will tend to decompose soluble ammonium humates to insoluble humic acids, as well as reducing its nitrogen content. When heating is maintained between the stated range, the pH of the product will be between 7.3 and 8.5 and preferably will be about 7.8.

Both the rotating drum 30 and the dryer 46 are conventional devices used in industry to compact, granulate and dry many organic and inorganic substances such as fish meal, beneficiated iron and phosphate ores, etc.

The product in dry pellet form issues from the drier 46 to be carried to a sizing device 48 by means of a conveyor 50. Preferably, the pellets are larger than 14 screen mesh and smaller than 6 screen mesh. The sizing device separates over and under size granules from desired size granules and delivers the desired size granules to output station 12. The off-size granules are recycled by way of conveyor means 51 to valve 34 for introduction into rotating drum 30 after going through a suitable crusher 52.

To start the process, ammonium humates from other sources may be used, recycling continuing until the desired level of pH is attained. With attainment of a consistent quality level of product, only off-sized portions of processed ore are then recycled.

In another aspect of the invention dry fertilizer constituents may be blended with the recycled product introduced into rotating drum 30 at channel 32 by means of valve 56 from one or more receptacles indicated generally by reference numeral 58. Such fertilizer components may be one or more of potassium sulfate, ammonium phosphate, ammonium nitrate, urea, or the like. Such a blend not only causes particularization or beading under moisture conditions substantially as stated for recycled product alone, but also helps to provide a plant food product which complements the values to be derived from humates alone for certain soil and plant conditions. Alternatively, such fertilizer components may be blended with humate obtained from output station 12.

Having described the invention in connection with certain specific embodiments thereof, it is to be understood that further modifications may now suggest themselves to those skilled in the art and it is intended to cover such modifications as fall within the scope of the appended claims.

What is claimed is:
1. The process of forming a soil nutrient from a leonardite ore which comprises the steps of:
   (a) wet grinding the ore to a relatively fine particle size to form slurry of leonardite ore particles and water, said slurry having a water content at least as great as that which was essential for the wet grinding thereof and not greater than 65% of the weight of the slurry.
   (b) treating the slurry under time-temperature conditions corresponding with 1–2 hours at from 70° F. to 100° F. with an excess of orthophosphoric acid to produce humic acids while maintaining the water content not to exceed about 65%,
   (c) thereafter concurrently mixing said acid slurry with dry product granules comprising the recycled granules referred to in step (e) while tumbling the mixture to cause said slurry to granulate, and while concurrently treating the mixture with anhydrous ammonia in amounts of about one part ammonia to ten parts acid in said slurry to react with the acids therein including humic acids and the excess of phosphoric acid and to bring the overall pH of said slurry to between 6 and 10, the water content of the slurry mixture during granulation being maintained between 25% and 40% by weight of the slurry,
   (d) drying the granules produced in step (c) by heated air to a moisture content of about 5% to

10% and a pH between about 7.3 and 8.5, the air temperature at the end of the drying being between about 170° F. to 200° F., and (e) recycling to step (c) a portion of said product granules and maintaining the total moisture content of the combined slurry and recycled granules to between 25% and 40% while removing the remaining portion of said granules as the fertilizer product.

2. The process of forming a soil nutrient from a wet ground slurry of leonardite ore, said slurry having a water content at least as great as that which was essential for the wet grinding thereof and not greater than 65% of the weight of the slurry, which comprises the steps of:

(a) treating the slurry under time-temperature conditions corresponding with 1-2 hours at from 70° F. to 100° F. with an excess of orthophosphoric acid to produce humic acids while maintaining the water content not to exceed about 65%, (b) thereafter concurrently mixing said acid slurry with dry product granules comprising the recycled granules referred to in step (d) while tumbling the mixture to cause said slurry to granulate, and while concurrently treating the mixture with anhydrous ammonia in amounts of about one part ammonia to ten parts acid in said slurry to react with the acids therein including humic acids and the excess of phosphoric acid and to bring the overall pH of said slurry to between 6 and 10, the water content of the slurry mixture during granulation being maintained between 25% and 40% by weight of the slurry.

(c) drying the granules produced in step (b) by heated air to a moisture content of about 5% to 10% and a pH between about 7.3 and 8.5, the air temperature at the end of the drying being between about 170° F. to 200° F., and (d) recycling to step (b) a portion of said product granules and maintaining the total moisture content of the combined slurry and recycled granules to between 25% and 40% while removing the remaining portion of said granules as the fertilizer product.

3. The method of claim 1 wherein heavy inert inorganic substances are removed in a sedimentation operation before said slurry is treated in step (a).

4. The method according to claim 1 in which at least one fertilizer component from the group consisting of potassium sulphate, ammonium phosphate, ammonium nitrate and urea is blended with the recycled product and supplied therewith to granulating step (c).

References Cited

UNITED STATES PATENTS

| | | | |
|---|---|---|---|
| 3,285,704 | 11/1966 | Sackett | 71—64 |
| 3,264,084 | 8/1966 | Karcher | 71—24 |
| 2,893,858 | 7/1959 | MacDonald et al. | 71—64 |
| 2,913,329 | 11/1959 | Geiersberger et al. | 71—43 XR |
| 3,005,696 | 10/1961 | Hignett et al. | 71—43 XR |

B. H. LEVENSON, Assistant Examiner

U.S. Cl. X.R.

71—64